March 24, 1931.  L. F. GAGE ET AL  1,797,859
PASTRY CUTTER
Filed Sept. 12, 1930
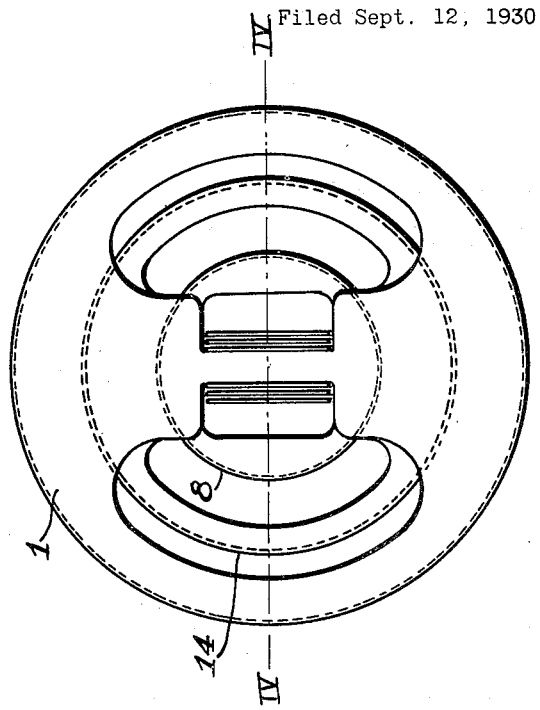
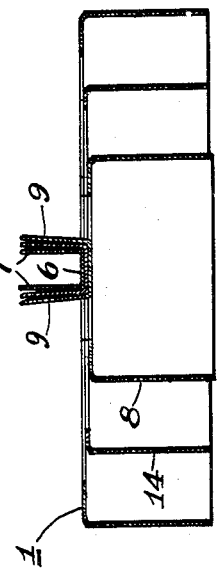
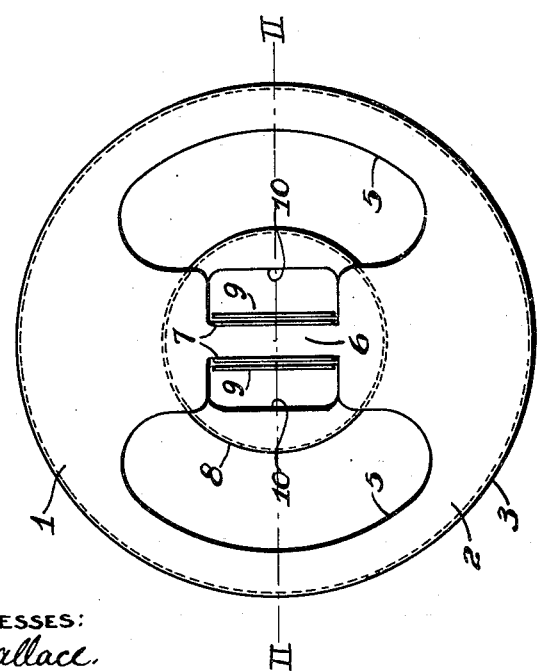
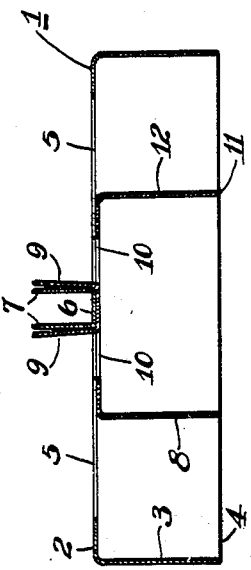
WITNESSES:
ABWallace
W. D. O'Connor
INVENTORS:
L. F. Gage, J. W. Wood
and J. Z. Weinzierl
by Brown & Critchlow
their attorneys Patented Mar. 24, 1931

1,797,859

UNITED STATES PATENT OFFICE

LEON F. GAGE, OF NEW KENSINGTON, IRVING W. WOOD, OF PARNASSUS, AND JOSEPH T. WEINZIERL, OF NEW KENSINGTON, PENNSYLVANIA, ASSIGNORS TO THE ALUMINUM COOKING UTENSIL COMPANY, OF NEW KENSINGTON, PENNSYLVANIA, A CORPORATION OF PENNSYLVANIA

PASTRY CUTTER

Application filed September 12, 1930. Serial No. 481,443.

Our invention relates generally to culinary implements and particularly to pastry cutters such as are used for cutting dough in the process of making cookies, doughnuts and the like.

Pastry cutters of this general type, as ordinarily utilized, consist of individual utensils which vary in size and shape and that may have been especially manufactured for the purpose or improvised from other articles ordinarily found in the kitchen, such as circular tops for cans. Usually it is desirable to have several cutters of circular shape and of different sizes for cutting discs from dough for cookies and the like and other double cutters for cutting annuli from dough in the process of making doughnuts or tarts. These prior art cutters are inconvenient to use, difficult to remove dough from and are unhandy to store away when not in use in that they take up considerable room and do not fit well into the space provided for such utensils in the kitchen.

It is therefore an object of this invention to provide a pastry cutter that is convenient to use and that is simple and inexpensive to manufacture.

Another object of the invention is to provide a pastry cutter from which the dough may be easily removed after it is cut.

A further object of the invention is to provide pastry cutters which may be nested together for use in combination or for storage when not in use.

The foregoing and other objects of this invention may be attained by the pastry cutters which are shown, as examples, in the accompanying drawing, in which Fig. 1 is a plan view of a culinary utensil embodying our invention, showing two cutting members combined to constitute a double pastry cutter; Fig. 2 is a view in cross section taken on the plane represented by the line II—II in Fig. 1; Fig. 3 is a plan view of a plurality of pastry cutters embodying our invention, illustrating the manner in which they may be nested for storage; and Fig. 4 is a view in cross section taken on the plane indicated by the line IV—IV of Fig. 3.

According to this invention pastry cutters are formed integrally of a sheet of metal and are provided with upstruck handle portions and pastry ejecting openings. A plurality of the cutters of different sizes may be made with handles which nest together in such manner that two cutters may be used in combination to constitute a double cutter or a plurality of cutters may be nested together to constitute a single article of trade.

The particular embodiment of the invention which is illustrated by the cutters shown in Fig. 1 comprises a large cutting element 1 formed integrally of a sheet of metal and comprising a disc-like top portion 2 having a peripheral annular flange 3, the marginal edge 4 of which constitutes the cutting edge of the device. The top portion 2 is provided with dough-ejecting openings 5 through which access may be had to the dough to force it out of the cutter and that also serve as vent holes for the pastry cutter. As illustrated, two dough-ejecting openings 5 are disposed at diametrically opposite sides of a connecting bridge member 6 that forms a tie or brace for holding the annular flange 3 in circular shape. The bridge 6 also constitutes the body portion of a handle for manipulating the cutter 1. As best shown in Fig. 2, the manipulating handle is formed by striking upwardly two wing-like members 7 which include portions of the metal cut from the pastry ejecting openings 5. The wings 7 are folded upwardly and towards each other from each side of the bridge 6 to a position in which they are substantially parallel to each other and perpendicular to the plane of the top 2.

The upstruck wings 7, that constitute the handle of the large cutting element 1, are disposed symmetrically relative to the center of the cutter, and are comparatively short in proportion to the diameter of the cutter in order that the handle may nest snugly within a similar handle on a smaller cutter 8, shown centrally disposed within the large cutter 1. The handle of the cutter 8 comprises upstruck wings 9 spaced somewhat farther apart than the wings 7 of the large cutter 1 so that they may be disposed outside of the wings 7 when nested together as shown in Fig. 2. For centering the cutter 8 within the cutter 1 the wings 9 are made slightly shorter than the wings 7 to pass through the dough-ejecting openings 5 and fit closely against the edges of the top 2. Dough-ejecting openings 10 are also provided in the top of the small cutter 8, these being formed by folding the wings 9 upwardly. In order that the cutting edge 11 of the small cutter 8 may be in the plane of the cutting edge 4 of the large cutter, the annular flange 12 of the cutter 8 is made of less depth than the flange 3 of the large cutter 1 by an amount equal to the thickness of the metal sheet of which the top 2 of the large cutter 1 is formed.

When nested together in this manner, the two cutters 1 and 8 may be used in combination as a double cutter for cutting annuli from dough for making doughnuts, tarts and the like. It is obvious that the two cutters may be readily separated and utilized individually for cutting discs from dough in the process of making cookies, biscuits and the like.

In Figs. 3 and 4 is illustrated a method in which a plurality of cutters embodying our invention may be nested together to constitute a single article which may be manufactured and sold as a unit. Such units may comprise any number of individual cutters which may be used singly, or in various combinations, as explained in detail with reference to the two cutters 1 and 8 shown in Figs. 1 and 2. In the particular article of manufacture shown in Figs. 3 and 4, a cutter 14 of intermediate size is shown nested between the large cutter 1 and the small cutter 8, and it is obvious that other cutters, both larger and smaller than those shown, may be added to the nest if they are desirable.

From the foregoing description, it is apparent that we have invented a new pastry cutter that is of simple and inexpensive design and that may be used either singly or in combiantion with other similar cutters for cutting discs and annuli of various sizes from dough for making articles of pastry.

Although we have shown and described one particular embodiment of this invention, it is apparent that modifications may be made in the upstruck handles, pastry-ejecting openings and in the proportions of other parts of our pastry cutter without departing from the spirit and scope of the invention as defined in the appended claims.

We claim:

1. A pastry cutter formed integrally of a sheet of metal, the cutter comprising a top and a marginal cutting flange, the top having two wing-like portions struck upwardly leaving pastry-ejecting openings in and constituting a manipulating handle for the cutter.

2. A pastry cutter formed integrally of a sheet of metal, the cutter comprising a top provided with a marginal cutting flange, the top having two upstruck wing-like portions spaced to provide a central bridging member and disposed substantially perpendicular to the top to constitute a manipulating handle.

3. A pastry cutter comprising two members of different diameters, each formed integrally of a sheet of metal, and each comprising a top provided with a marginal cutting flange, said top having wing-like upstruck portions constituting a handle, the handles on the two members being disposed to nest one within the other to form a single engaging member for manipulating the combined cutter.

4. A pastry cutter comprising two members of different diameters, each formed integrally of a sheet of metal, and each comprising a top provided with a marginal cutting flange, said top having wing-like upstruck portions constituting a handle, the handle on the larger member being of length substantially equal to that of the handle on the smaller member, and said handles being disposed to nest together in such manner that the smaller member is centrally positioned within the larger member for cooperative action therewith.

5. A pastry cutter comprising two members of different diameters, each formed integrally of a sheet of metal, and each comprising a top provided with a marginal cutting flange, said top having wing-like upstruck portions constituting a handle, the handle with a bridging member between said portions on the two members being disposed to nest one within the other in such manner that the members may be utilized in combination, and providing pastry-ejecting openings, the bridging member of the handle on the smaller member being slightly wider than that of the handle on the larger member, and the handle of the smaller member being of such length that it passes through the pastry-ejecting openings in the larger member and nests snugly with the handle thereof in such manner that the two members are held in co-axial relation.

In testimony whereof, we hereunto sign our names.

LEON F. GAGE.
IRVING W. WOOD.
JOSEPH T. WEINZIERL.